United States Patent
Jewell et al.

(10) Patent No.: US 9,805,356 B2
(45) Date of Patent: Oct. 31, 2017

(54) POINT OF SALE DISPLAY OF GREETING CARDS OR SCRAPBOOKS WITH ADJACENT DISPLAY OF AFFIXABLE MEDIA HAVING SCANNABLE WEBSITE ADDRESSES

(71) Applicants: Michael T. Jewell, Indianapolis, IN (US); Loren R. White, Indianapolis, IN (US)

(72) Inventors: Michael T. Jewell, Indianapolis, IN (US); Loren R. White, Indianapolis, IN (US)

(*) Notice: Subject to any disclaimer, the term of this patent is extended or adjusted under 35 U.S.C. 154(b) by 0 days.

(21) Appl. No.: 14/793,247

(22) Filed: Jul. 7, 2015

(65) Prior Publication Data
US 2016/0019516 A1      Jan. 21, 2016

Related U.S. Application Data

(60) Provisional application No. 62/025,751, filed on Jul. 17, 2014.

(51) Int. Cl.
| | |
|---|---|
| *G06F 17/00* | (2006.01) |
| *G06Q 20/20* | (2012.01) |
| *B42D 1/08* | (2006.01) |
| *B42D 15/04* | (2006.01) |

(52) U.S. Cl.
CPC ............. *G06Q 20/208* (2013.01); *B42D 1/08* (2013.01); *B42D 15/042* (2013.01)

(58) Field of Classification Search
CPC .......... B42D 15/042; B42D 1/08; G06K 9/18; G06Q 20/208
See application file for complete search history.

(56) References Cited

U.S. PATENT DOCUMENTS

| | | |
|---|---|---|
| 6,965,912 B2 | 11/2005 | Friedman et al. |
| 7,020,888 B2 | 3/2006 | Reynolds et al. |
| 7,236,258 B2 | 6/2007 | Wen et al. |
| (Continued) | | |

FOREIGN PATENT DOCUMENTS

| | | |
|---|---|---|
| WO | WO 2013/126350 A1 | 8/2013 |

OTHER PUBLICATIONS

Search Report and Written Opinion dated Oct. 6, 2015 in PCT/US2015/39395.

(Continued)

*Primary Examiner* — Thien M Le
*Assistant Examiner* — Asifa Habib
(74) *Attorney, Agent, or Firm* — Overhauser Law Offices LLC

(57) ABSTRACT

A system for personalizing printed cards or scrapbooks with web-based links comprises a point of sale display of greeting cards or scrapbooks and a plurality of affixable media. Each of the affixable media comprise a scannable code and a description of the online content that will be displayed when the code is scanned by a recipient. A purchaser is able to create a personalized card or scrapbook by selecting a card or scrapbook from the point of sale display, selecting a scannable code based on its associated description, and then affixing the selected scannable code to the selected card or scrapbook, thereby creating a personalized card or scrapbook that directs the recipient to online content chosen by the purchaser from the set of options provided by the various affixable media.

1 Claim, 5 Drawing Sheets

(56) References Cited

U.S. PATENT DOCUMENTS

| | | | |
|---|---|---|---|
| 7,370,076 B2 | 5/2008 | Friedman et al. | |
| 7,575,172 B2 | 8/2009 | Silverbrook et al. | |
| 8,430,298 B2 | 4/2013 | Martinez et al. | |
| 8,651,370 B1 | 2/2014 | Mudrick et al. | |
| 8,985,437 B2 * | 3/2015 | Burkhart | G06K 19/06037 235/375 |
| 2004/0139318 A1 | 7/2004 | Fiala et al. | |
| 2005/0211776 A1 | 9/2005 | Morgan et al. | |
| 2005/0286463 A1 * | 12/2005 | Matsumoto | H04N 1/0044 370/328 |
| 2007/0139692 A1 * | 6/2007 | Martin | G06Q 10/06 358/1.15 |
| 2009/0070213 A1 | 3/2009 | Miller et al. | |
| 2011/0202624 A1 | 8/2011 | Najm | |
| 2012/0284649 A1 | 11/2012 | Levy | |
| 2012/0325901 A1 | 12/2012 | Ross | |
| 2013/0018726 A1 * | 1/2013 | Ionescu | G06Q 30/00 705/14.49 |
| 2013/0046781 A1 | 2/2013 | Frankel et al. | |
| 2013/0126598 A1 * | 5/2013 | Beadles | G06K 19/005 235/375 |
| 2013/0292462 A1 | 11/2013 | Hoffman et al. | |
| 2013/0307997 A1 * | 11/2013 | O'Keefe | H04L 51/10 348/207.1 |
| 2014/0122273 A1 | 5/2014 | Argue et al. | |

OTHER PUBLICATIONS

"Scrapbooking and QR Codes", Nov. 28, 2012, 3 pages; webpage from website: http://qreateandtrack.com/2012/11/28/scrapbook-qr-codes/.

* cited by examiner

POINT OF SALE DISPLAY OF GREETING CARDS OR SCRAPBOOKS WITH ADJACENT DISPLAY OF AFFIXABLE MEDIA HAVING SCANNABLE WEBSITE ADDRESSES

RELATED APPLICATION DATA

This application claims the benefit of U.S. Provisional Application 62/025,751, filed Jul. 17, 2014.

FIELD OF THE INVENTION

The present invention relates to a system for personalizing cards and scrapbooks with web-based links.

BACKGROUND

Personal notes are often added to greeting cards and scrapbooks. However, such notes are generally limited to brief sentences. Some greeting cards play a song when the card is opened. However, the variety of songs that can be played by greeting cards is limited to number of types of cards that can be displayed in the greeting card display. In addition, each song is typically associated only with one card. For example, a purchaser may desire a card that plays "Sugar Pie Honeybunch" when opened, hot the pre-printed card playing this song may not have a picture the purchaser desires. Accordingly, greeting card consumers lack the ability to select which song is associated with which card, as the selection is predetermined by the greeting card manufacturer.

Greeting card purchasers also may desire more options for songs that could be played than what is presently available. Also, some greeting card purchasers may prefer to direct the card recipient not to a song, but to a website with relevant sentimental content. For example, if a couple went to San Francisco for their honeymoon, a personalized Anniversary card might be one that either: (a) plays a song like "I Left My Heart in San Francisco;" or (b) that refers the recipient to a webpage describing San Francisco.

Prior systems include US2013/0292462 Hoffman, et al.; US2009/0070213 Miller, et al.; US2013/0018726 Ionescu, et al.; US2013/0126598 Beadles, et al.; U.S. Pat. No. 8,851,370 Mudrick, et al.; U.S. Pat. No. 8,272,562 Ziegler, et al.; US2004/0139318 Fiala, et al.; US2012/0325901 Ross; US2013/0046781 Frankel, et al.; U.S. Pat. No. 7,575,172 Silverbrook, et al.; US2011/0202624 Najm; U.S. Pat. No. 6,965,912 Friedman, et al.; U.S. Pat. No. 7,236,258 Wen, et al.; U.S. Pat. No. 7,370,076 Friedman, et al.; U.S. Pat. No. 8,430,298 Martinez, et al.; "The Secret Lives of Objects: StickyBits Turn Barcodes into Personal Message Boards," Schonfeld 2010; and "MEMENTO: A. Digital Physical Scrapbook for Memory Sharing," West, et al. 2007.

SUMMARY OF THE INVENTION

One embodiment of the invention is a unique point of sale display of greeting cards or scrapbooks with adjacent affixable media with scannable website addresses corresponding to an available set of content options. There is a rack of greeting cards or scrapbooks. Adjacent the rack are affixable media (e.g., stickers), each of which is substantially smaller than the cards so as to be affixable on a portion of a card. Each affixable media has a bar code (which may be a QR code) and a description of the pre-recorded content that will, be displayed on a web browser when the bar code is scanned. The bar code and description may be separable so that only the bar code is affixed to the card. A purchaser is able to create a personalized card or scrapbook by selecting a card or scrapbook from the point of sale display, selecting scannable codes based on their associated descriptions, and then affixing the selected scannable code(s) to the selected card or scrapbook, thereby creating a personalized card or scrapbook that directs the recipient to the content chosen by the purchaser from the set of options provided by the various affixable media. The scannable codes may be separable from their associated descriptions so that only the scannable codes are affixed to the card or scrapbook, thereby heightening the element of surprise for the recipient of the card.

Other embodiments include unique methods, systems, devices, and apparatus for providing consumers the ability to apply bar codes to greeting cards or scrapbooks that, when scanned by the recipient of the card or scrapbook, take the recipient to a website wherein desired content is displayed. Further embodiments, forms, objects, aspects, benefits, features, and advantages of the present application shall become apparent from the description, and figures provided herewith.

BRIEF DESCRIPTION OF THE DRAWINGS

Features of the invention will be better understood from the following detailed description when considered in reference to the accompanying drawings, in which.

DETAILED DESCRIPTION

Figure 1:
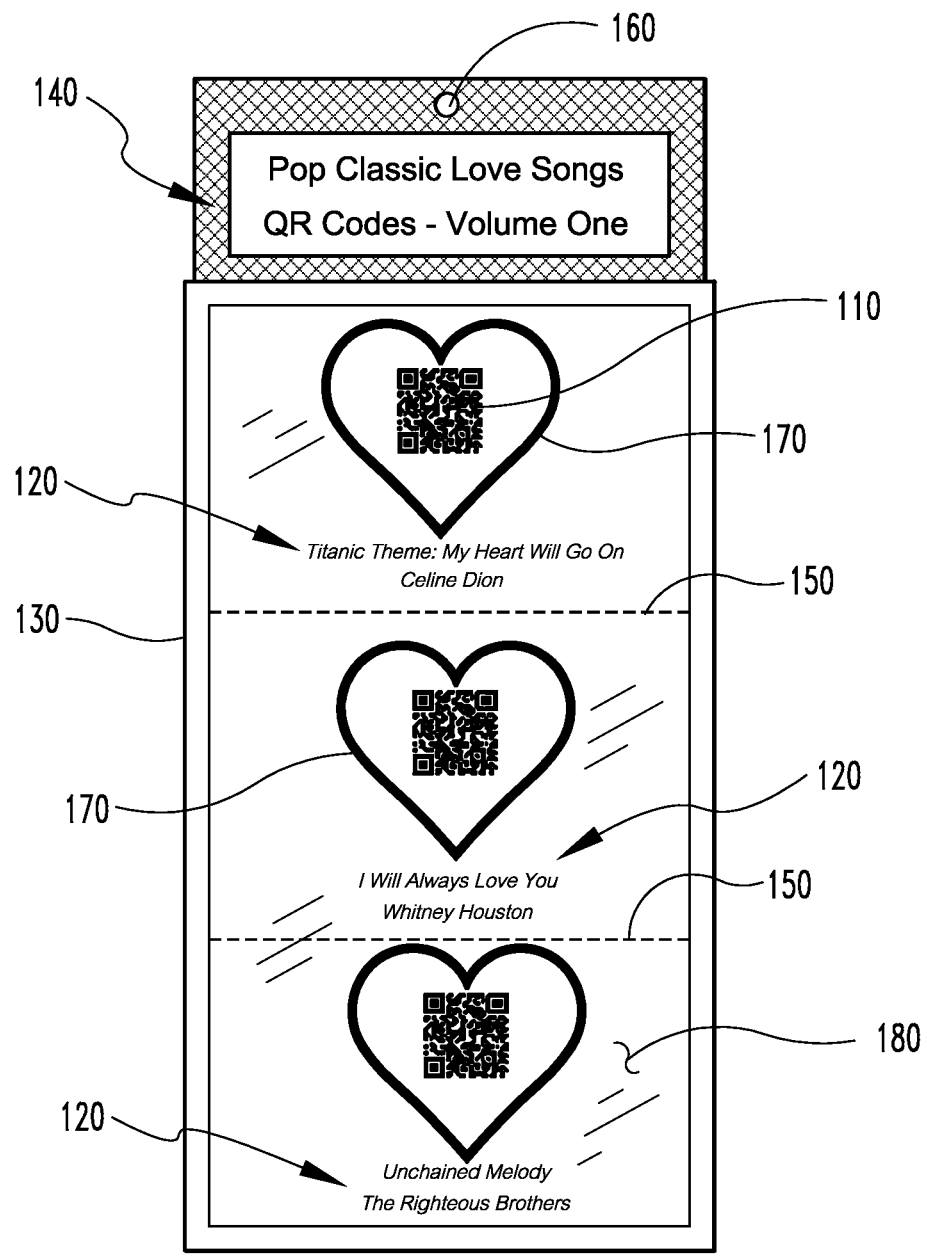
FIG. 1 shows a package of affixable QR codes that would direct the recipient to different love songs.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

In one aspect, the invention is a point of sale display of greeting cards or scrapbooks with adjacent affixable media with scannable website addresses that correspond to a set of content options. There is a rack of greeting cards or scrapbooks. Adjacent the rack are affixable media (e.g., stickers or stamps), each of which is substantially smaller than the cards so that, when applied to a card, the affixable media only covers a portion of the card. Each affixable media has a bar code (which may be a QR code) and a description of the pre-recorded audio or visual content that will be displayed on a web browser when the bar code is scanned, for example by a smartphone, tablet, or similar mobile computing device. The bar code may be separable from the description so that only the bar code is affixed to the card.

The content corresponding to each affixable media is established ahead of time by the provider of the affixable media and will generally correspond to a set of pre-recorded music and/or videos. Examples of content descriptions are:

a. Scanning this bar code will take one to a website that will play the sons; "I Left My Heart in San Francisco"

b. Scanning this bar code will take one to a website that will play the video; "About San Francisco"

c. Scanning ibis bar code will take one to a website that will play the song: "New York, New York"

d. Scanning ibis bar code will take one to a website that will play the video; "About New York"

e. Scanning this bar code will take one to a website that will play the song: "Sugar Pie Honeybunch"

To create a personalized card or scrapbook, a purchaser selects a card or scrapbook from the point of sale display in the conventional fashion. The purchaser also reviews the various descriptions for the affixable media and, based on those descriptions, selects the scannable code(s) of its choosing. Then the purchaser affixes the selected scannable code(s) to the selected card or scrapbook, thereby creating a personalized card or scrapbook that directs the recipient to audio or video content that has been chosen by the purchaser from the set of available content options provided by the various affixable media.

FIG. 1 shows a package of affixable QR codes for presentation at a point of purchase display. The package includes a number of different QR codes 110, three of which are visible in the figure. The package includes a package label 140 that describes the general type of content that will be displayed by the various codes 110 in the package, and below each of the individual QR codes 110 is description 120 of the specific content corresponding to the individual code 110. In this case, the package label 140 is "Pop Classic Love Songs Volume 1," and the individual descriptions 120 include the title and artist for three specific songs (i.e. *Titanic Theme: My Heart Will Go On*, by Celine Dion; *I will Always Love You*, by Whitney Houston; and *Unchained Melody* by The Righteous Brothers.)

The package includes a backing 130 with a hole 160 for hanging the package on a conventional display rack hanger and a transparent covering 180 that allows a purchaser to read the individual descriptions 120. Each of the individual QR codes 110 is surrounded by a graphical element 170, which in this case is a heart shaped graphic. The individual codes are separable from each other by separators 150, which may be perforations. These perforations allow a purchaser to select a single one of the codes 110 to apply to any particular card.

The QR codes may fee configured to be peeled off of the backing material and then applied to a desired surface (i.e. a greeting card or scrapbook) independently from the associated description 120. Thus, the QR code purchaser retains the ability to decide whether or not to apply the description 120 to the card or scrapbook. Alternatively, the codes and descriptions can be designed so as to be applied to the card or scrapbook page together.

Figure 2:
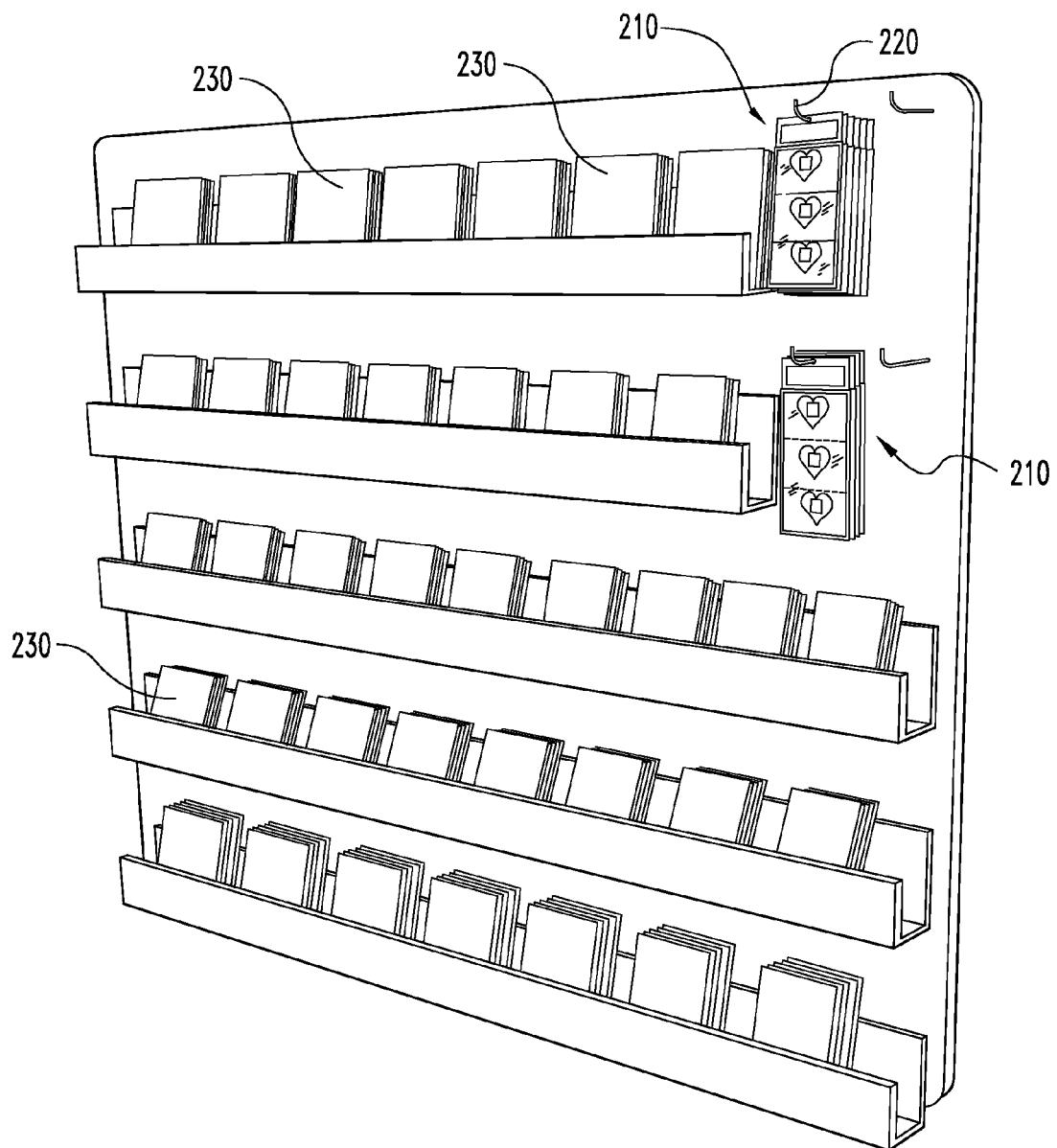
FIG. 2 shows adjacent display of racks of greeting cards and packages of the affixable QR codes shown in FIG. 1.

FIG. 2 shows a point of purchase display of conventional greeting cards 230. Adjacent the greeting cards 230 are a number of packages 210 of affixable media. The packages 210 may correspond to the packages of QR codes shown in FIG. 1 and are shown hanging on the display rack hooks 220.

Figure 5:
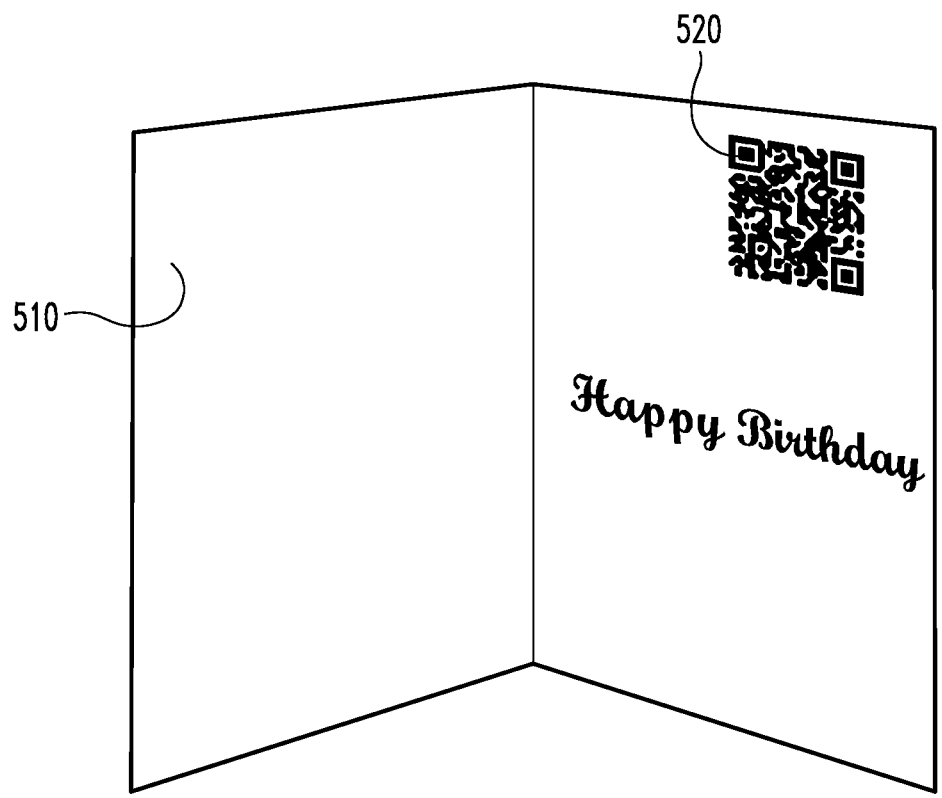
FIG. 5 shows the inside of a greeting card after a selected QR code has been applied by the consumer.

In general, the types of affixable media (ie. QR codes) may be greater than the number of types of cards, and each affixable media may be smaller than the average card. By having the QR codes be smaller than the average card, the codes may be affixed to the card without obscuring any existing content on the card. In other words, the QR codes may serve to supplement the card content rather than replace it. FIG. 5 shows the inside of a greeting card alter a selected QR code 520 has been applied by the consumer. As can be seen, the QR code 520 has been applied without its associated description and only covers a relatively small fraction of the inside surface 510 of the card leaving plenty of room for additional content (such as the preprinted text "Happy Birthday").

Figure 3A:
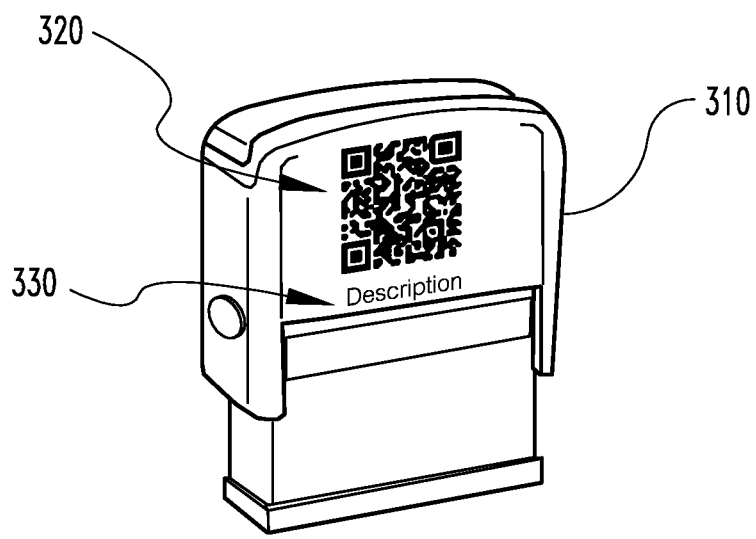
FIGS. 3A and 3B show rubber stamps of a QR code with the description of the content that will be displayed when the QR code is scanned.
Figure 3B:
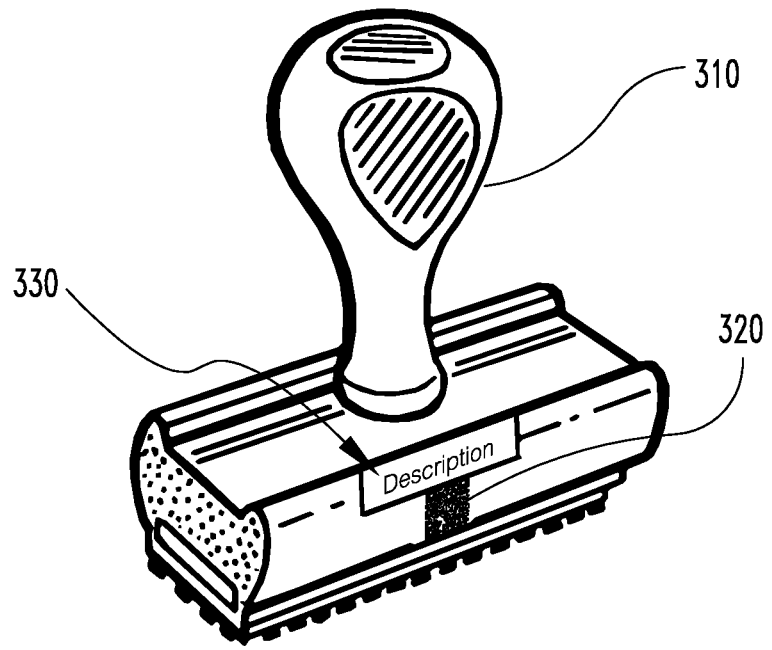

As an alternative to the packages of affixable media, the point of purchase display can include a number of stamps for applying various QR codes to the cards. FIGS. 3A and 3B show exemplary rubber stamps 310 for presentation at the point of purchase display. Each stamp 310 is designed to apply a particular QR code. The stamps include a representation of the QR code 320 and a description 330 of the content that would be displayed when the QR code is scanned. The stamps 310 apply the QR code by printing the QR code in ink on the card. FIG. 3A shows a stamp with an ink pad that is integrated into the stamp in the conventional, fashion. FIG. 3B shows a stamp that would use a separate ink pad.

Figure 4A:
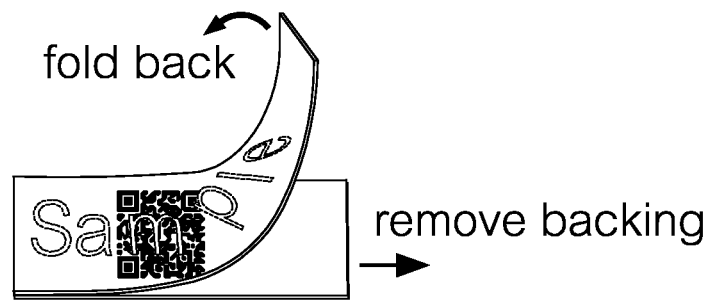
FIGS. 4A-4D show the affixing of a QR code to the surface of a card or scrapbook by the consumer.
Figure 4B:
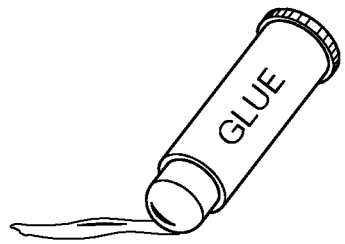
Figure 4C:
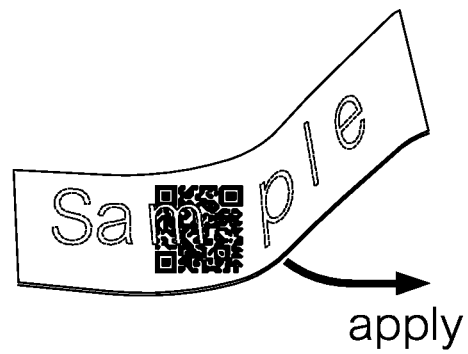
Figure 4D:

FIGS. 4A-4D shows various process steps that may be utilized to affix the QR codes shown in FIG. 1 to the surface of a card or scrapbook by the consumer. FIG. 4A shows a QR code in the form of a sticker being removed from its backing. Where the description for the QR code is contained on the backing, this step may serve to separate the QR code from its associated description. FIG. 4B shows the optional application of glue to the surface where the QR code to be applied. This step would be useful when the QR codes are not self-adhesive. FIG. 4C shows the QR code being applied to the surface, and FIG. 4D shows the QR code being smoothed down onto the surface.

A buyer may buy a greeting card (or scrapbook), buy an affixable media, then place the affixable media in the card/scrapbook or on an item associated therewith (such as the envelope for the card). Means for affixing the affixable media in the card may be, for example; (a) a sticker on or of the affixable media; or (b) corners on the affixable media, positioned to fit into matching slots in the card; or (c) the card may have a pocket into which the affixable media fits; or (d) the affixable media may be stamped onto the card; or (e) the affixable media may be put in place with regular home or office glue.

The invention also encompasses a display of scrapbooks next to the display of affixable media.

As is known in the art, QR Codes are designed so that the camera-based scanners of the code are directed to a certain destination and function on their mobile devices (e.g. mobile phone or Tablet PC). The function refers to the action that the phone is supposed to do, such as the opening of a URL with the phone's browser, and the destination refers to the specific goal that the action is supposed to accomplish, such as the particular website that the browser should open. As is known in the art, the generator of the QR Code chooses both the function and the destination and these are encoded into the QR code in either a static or dynamic fashion. In a static QR code, the destination (i.e. the particular url to be opened) is fixed and embedded in the QR code itself. In a dynamic QR code, the generator of the QR code retains the ability to modify the destination URL after the QR code has been generated, for example to change from one version of the song described in the description to another version the song. This modification is typically accomplished by having the QR code initially direct the mobile phone's browser to an intermediate location that then redirects to the appropriate destination based on whatever code has been embedded in the QR code. It is to be understood that the present invention may be utilized with both static and dynamic QR codes or with other types of scannable codes that serve to direct the scanner of the code to an internet destination.

As is known in the art, QR codes can be generated based on a number of different data types so as to direct the scanner of the code to various types of online content. These include website URLs, youtube videos, google maps locations, twitter, facebook, LinkenIn, Instagram, foursquare, app store download, iTunes links, dropbox locations, calendar invites, PayPal buy now links, contact details, and digital business cards. It is to be understood that the present invention can be implemented with QR codes embedded with any of these various types of information and/or direct users to these various types of online content.

Those of skill in the art will understand that various details of the invention may be changed without departing from the spirit and scope of the invention. Furthermore, the foregoing description is for illustration only, and not for the purpose of limitation, the invention being defined by the claims.

While the invention has been illustrated and described in detail in the foregoing drawings and description, the same is to be considered as illustrative and not restrictive in character, it being understood that only illustrative embodiments thereof have been shown and described and that all changes and modifications that are within the scope of the following claims are desired to be protected.

All references cited in this specification are incorporated herein by reference to the extent that they supplement, explain, provide a background for or teach methodology or techniques employed herein.

What is claimed is:

1. A system for a point of sale display for an online content presentation system comprising:
   a display rack;
   a presentable media attached to the display rack whereby the presentable media is selectable by a user; and
   a plurality of affixable media selectable by the user based on an associated provider pre-recorded online content, each of the plurality of affixable media having:
      a directing message surrounded by a graphical element to direct a recipient to the associated provider pre-recorded online content,
      a description of the associated provider pre-recorded online content which the recipient is directed to by the directing message, and
      a package for the presentable media and the affixable media with a backing configured to attach the package to the display rack and a transparent covering;
   wherein one of the plurality of the affixable media is separable from another of the plurality of affixable media,
   wherein the directing message is separable from the description of the associated provider pre-recorded online content,
   wherein at least one of the plurality of affixable media is configured to be affixed to the presentable media viewable by the recipient and to direct the recipient to the associated provider pre-recorded online content,
   wherein the plurality of affixable media is selected from a group of media consisting of an inked stamp, a self-adhesive sticker, an insertable card, a card with activatable adhesive, and combinations thereof,
   wherein the directing message is selected from a group of messages consisting of a scannable code, a website address, a static QR code, a dynamic QR code, and combinations thereof,
   wherein the associated provider pre-recorded online content is selected from a group of online content consisting of an online audio-visual file, a text message, a digital posting, a multimedia message transmission, an online electronic multimedia source, an online map location, an online personal profile, an online music file, and combinations thereof,
   wherein the presentable media is selected from a group of media consisting of a greeting card, a scrapbook and combinations thereof, and
   wherein the plurality of affixable media is substantially smaller than the presentable media.

* * * * *